United States Patent
Toishi

(10) Patent No.: US 7,633,660 B2
(45) Date of Patent: Dec. 15, 2009

(54) HOLOGRAM RECORDING APPARATUS AND METHOD

(75) Inventor: Mitsuru Toishi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 12/079,011

(22) Filed: Mar. 24, 2008

(65) Prior Publication Data
US 2008/0180767 A1 Jul. 31, 2008

Related U.S. Application Data

(62) Division of application No. 11/099,095, filed on Apr. 5, 2005, now Pat. No. 7,394,581.

(30) Foreign Application Priority Data
Apr. 6, 2004 (JP) ............... 2004-111823

(51) Int. Cl.
G03H 1/28 (2006.01)
(52) U.S. Cl. ............... 359/24; 359/11; 369/103
(58) Field of Classification Search ........... 359/11, 359/22, 24, 25, 30, 32; 369/103, 112.01
See application file for complete search history.

(56) References Cited

U.S. PATENT DOCUMENTS

| | | | |
|---|---|---|---|
| 5,696,613 A * | 12/1997 | Redfield et al. | 359/32 |
| 5,943,145 A * | 8/1999 | Curtis et al. | 359/22 |
| 2003/0063342 A1 * | 4/2003 | Horimai | 359/22 |
| 2003/0231573 A1 * | 12/2003 | Matsumoto et al. | 369/112.29 |
| 2004/0027629 A1 * | 2/2004 | Wilson et al. | 359/11 |

FOREIGN PATENT DOCUMENTS

JP 11-242424 9/1999

* cited by examiner

Primary Examiner—Alessandro Amari
(74) Attorney, Agent, or Firm—Robert J. Depke; Rockey, Depke & Lyons, LLC

(57) ABSTRACT

A hologram recording apparatus includes a laser light source for emitting laser light, a light splitter for splitting the laser light emitted from the laser light source into a signal beam and a reference beam, a light modulator for modulating the signal beam split by the light splitter, a phase modulator for phase-modulating the reference beam split by the light splitter, an optical system for collecting the signal beam modulated by the light modulator and the reference beam phase-modulated by the phase modulator onto almost the same collecting position on a hologram recording medium, a collecting-position control mechanism for controlling the collecting position along a surface of the hologram recording medium, and a distance control mechanism for controlling the distance between the phase modulator and the hologram recording medium.

3 Claims, 5 Drawing Sheets

HOLOGRAM RECORDING APPARATUS AND METHOD

CROSS REFERENCES TO RELATED APPLICATIONS

The subject matter of application Ser. No. 11/099,095, is incorporated herein by reference. The present application is a Divisional of U.S. Ser. No. 11/099,095, filed Apr. 5, 2005, now U.S. Pat. No. 7,394,581 which claims priority to Japanese Patent Application JP 2004-111823 filed in the Japanese Patent Office on Apr. 6, 2004, the entire contents of which are incorporated herein by reference.

BACKGROUND OF THE INVENTION

1. Field of the Invention

The present invention relates to a hologram recording apparatus and a hologram recording method that perform recording by holography.

2. Description of the Related Art

Development of hologram recording apparatuses that record data by holography has advanced.

In hologram recording apparatuses, a modulated (data-superimposed) signal beam and an unmodulated reference beam are produced from laser light, and are applied onto the same point on a hologram recording medium. As a result, the signal beam and the reference beam interfere with each other on the hologram recording medium, and a diffraction grating (hologram) is formed at the point where the beams are applied; that is, data is recorded on the hologram recording medium.

By applying a reference beam onto a medium on which a hologram is recorded, diffracted light (reproduction light) is produced from the recorded diffraction grating. Since the reproduction light includes the same data superimposed on the signal beam during recording, it is received by a photoreceptor to reproduce recorded signals.

Multiple holograms are sometimes formed on a hologram recording medium in order to record much information. In this case, holograms can be formed not only at different positions on the hologram recording medium, but also on the same position (or in overlapping regions). This recording method is so-called multiplex recording. Various multiplex recording methods, such as angle multiplexing, wavelength multiplexing, and rotation multiplexing, have been proposed hitherto.

For example, in angle multiplexing, holograms are formed on the same position on a hologram recording medium while changing the incident angle of a reference beam. By using a reference beam similar to the reference beam used for recording during reproduction, reproduction light and data corresponding to a plurality of holograms formed on the same position can be obtained.

Hologram recording apparatuses have been developed which increase the recording capacity by utilizing phase correlation multiplexing as a kind of multiplexing method, as disclosed in Japanese Unexamined Patent Application Publication No. 11-242424.

SUMMARY OF THE INVENTION

However, there is a limitation to increasing the recording density by multiplex recording. In order to increase the recording density, the shift amount during recording is reduced (the shift amount corresponds to, for example, the amount of movement, change in angle, or change in wavelength, depending on the multiplexing method). When the shift amount is reduced, crosstalk easily occurs between a plurality of recording regions, and this should be prevented by any means. Moreover, the reduction of the shift amount makes optical and mechanical designs and production difficult.

It is desirable to provide a hologram recording apparatus and a hologram recording method that can more reliably increase the recording density on a hologram recording medium in multiplex recording.

A hologram recording apparatus according to a first embodiment of the present invention includes a laser light source for emitting first laser light, a first light splitter for splitting the first laser light emitted from the laser light source into a first signal beam and a first reference beam, a light modulator for modulating the first signal beam split by the first light splitter, a phase modulator for phase-modulating the first reference beam split by the first light splitter, an optical system for collecting the first signal beam modulated by the light modulator and the first reference beam phase-modulated by the phase modulator onto almost the same collecting position on a hologram recording medium, a collecting-position control mechanism for controlling almost the same collecting position along a surface of the hologram recording medium, and a distance control mechanism for controlling the distance between the phase modulator and the hologram recording medium.

Multiplex recording in the depth direction of the hologram recording medium can be performed by controlling the distance between the phase modulator and the hologram recording medium. Multiplex recording along the surface of the hologram recording medium can be performed by controlling the beam collecting position. Since the reference beam passes through the phase modulator, it is necessary to greatly change the distance between the phase modulator and the hologram recording medium, and the collecting position. Multiplex recording can be performed by changing the distances in two (or three) directions, and the recording density can be increased by combining some multiplex recording methods.

The collecting-position control mechanism may include a medium driving unit that drives the hologram recording medium to control almost the same collecting position along the surface of the hologram recording medium, or an optical-system driving unit that drives the optical system and the phase modulator to control almost the same collecting position along the surface of the hologram recording medium.

Multiplex recording can be performed along the surface of the hologram recording medium by driving the hologram recording medium, or the optical system and the phase modulator.

The distance control mechanism may include a medium driving unit that drives the hologram recording medium to control the distance between the phase modulator and the hologram recording medium, or a modulator driving unit that drives the phase modulator to control the distance.

Multiplex recording can be performed in the depth direction of the hologram recording medium by driving one of the hologram recording medium and the phase modulator.

The hologram recording apparatus may further include a collecting-angle control mechanism that controls the incident angles of the first signal beam and the first reference beam with respect to the hologram recording medium.

In this case, angle multiplexing can be performed in addition to multiplex recording in the surface direction and depth direction of the hologram recording medium. This further increases the recording density.

The hologram recording apparatus may further include a rotation control mechanism that controls the rotation of the phase modulator with respect to the hologram recording medium.

In this case, rotation multiplexing can be performed in addition to multiplex recording in the surface direction and depth direction of the hologram recording medium. This further increases the recording medium.

Preferably, the laser light source emits second laser light having a wavelength different from the wavelength of the first laser light, the hologram recording apparatus further includes a second light splitter that splits the second laser light into a second signal beam and a second reference beam, the light modulator modulates the second signal beam split by the second light splitter, the phase modulator phase-modulates the second reference beam split by the second light splitter, and the optical system collects the second signal beam modulated by the light modulator and the second reference beam phase-modulated by the phase modulator near almost the same collecting position on the hologram recording medium.

In this case, wavelength multiplexing can be performed in addition to multiplex recording in the surface direction and depth direction of the hologram recording medium. This further increases the recording medium.

The hologram recording apparatus may further include a light-intensity control mechanism that controls the light intensities of the first signal beam and the first reference beam to be collected at almost the same collecting position in accordance with the amount of light accumulated on the collecting position.

By controlling the light intensities in accordance with the residual quantity of a recording material (e.g., monomers as an organic material), the uniformity of recorded holograms can be increased.

A hologram recording method according to a second embodiment of the present invention includes the steps of performing angle multiplexing by collecting a signal beam modulated by a light modulator and a reference beam phase-modulated by a phase modulator at almost the same collecting position on a hologram recording medium, changing the distance between the hologram recording medium and the phase modulator, and performing angle multiplexing by collecting the signal beam modulated by the light modulator and the reference beam phase-modulated by the phase modulator at the collecting position after the distance between the hologram recording medium and the phase modulator is changed.

By changing the distance between the hologram recording medium and the phase modulator after angle multiplexing is first performed, angle multiplexing can be performed again. This increases the recording density.

A hologram recording method according to a third embodiment of the present invention includes the steps of performing wavelength multiplexing by collecting a signal beam modulated by a light modulator and a reference beam phase-modulated by a phase modulator at almost the same collecting position on a hologram recording medium, changing the distance between the hologram recording medium and the phase modulator, and performing wavelength multiplexing by collecting the signal beam modulated by the light modulator and the reference beam phase-modulated by the phase modulator at the collecting position after the distance between the hologram recording medium and the phase modulator is changed.

By changing the distance between the hologram recording medium and the phase modulator after wavelength multiplexing is first performed, wavelength multiplexing can be performed again. This increases the recording density.

A hologram recording method according to a fourth embodiment of the present invention includes the steps of performing rotation multiplexing by collecting a signal beam modulated by a light modulator and a reference beam phase-modulated by a phase modulator at almost the same collecting position on a hologram recording medium, changing the distance between the hologram recording medium and the phase modulator, and performing rotation multiplexing by collecting the signal beam modulated by the light modulator and the reference beam phase-modulated by the phase modulator at the collecting position after the distance between the hologram recording medium and the phase modulator is changed.

By changing the distance between the hologram recording medium and the phase modulator after rotation multiplexing is first performed, rotation multiplexing can be performed again. This increases the recording density.

A hologram recording method according to a fifth embodiment of the present invention includes the steps performing recording by collecting a signal beam modulated by a light modulator and a reference beam phase-modulated by a phase modulator on a first collecting position on a hologram recording medium and by moving the first collecting position along a surface of the hologram recording medium, changing the distance between the hologram recording medium and the phase modulator, and performing recording by collecting the signal beam modulated by the light modulator and the reference beam phase-modulated by the phase modulator on a second collecting position after the distance between the hologram recording medium and the phase modulator is changed, and by moving the second collecting position along the surface of the hologram recording medium.

By changing the distance between the hologram recording medium and the phase modulator after multiplex recording along the surface of the hologram recording medium is first performed, multiplex recording in that direction can be performed again. This increases the recording density.

A hologram recording method according to a sixth embodiment of the present invention includes the steps of performing recording by collecting a signal beam modulated by a light modulator and a reference beam phase-modulated by a phase modulator on a first position on a hologram recording medium and by changing the distance between the hologram recording medium and the phase modulator, moving a collecting position of the signal beam and the reference beam from the first position to a second position on the hologram recording medium along a surface of the hologram recording medium, and performing recording by collecting the signal beam modulated by the light modulator and the reference beam phase-modulated by the phase modulator on the second position and by changing the distance between the hologram recording medium and the phase modulator.

After multiplex recording in the depth direction of the hologram recording medium, the collecting position is changed along the surface of the hologram recording medium, and multiplex recording in the same direction is performed again. This increases the recording density.

A hologram recording method according to a seventh embodiment of the present invention includes the steps of performing recording by collecting a signal beam modulated by a light modulator and a reference beam phase-modulated by a phase modulator on a first region on a hologram recording medium, moving a collecting region of the signal beam and the reference beam from the first region to a second region that overlaps with the first region, and performing recording by collecting the signal beam modulated by the light modulator and the reference beam phase-modulated by the phase modulator on the second region, the intensities of the signal beam and the reference beam being higher than in the first recording step.

By controlling the light intensities in accordance with the residual quantity of a recording material (e.g., monomers as an organic material), the uniformity of recorded holograms can be increased.

As described above, the embodiments of the present invention provide a hologram recording apparatus and a hologram recording method that can more reliably increase the recording density on a hologram recording medium in multiplex recording.

DESCRIPTION OF THE PREFERRED EMBODIMENTS

An embodiment of the present invention will be described below with reference to the drawings.

Figure 1:
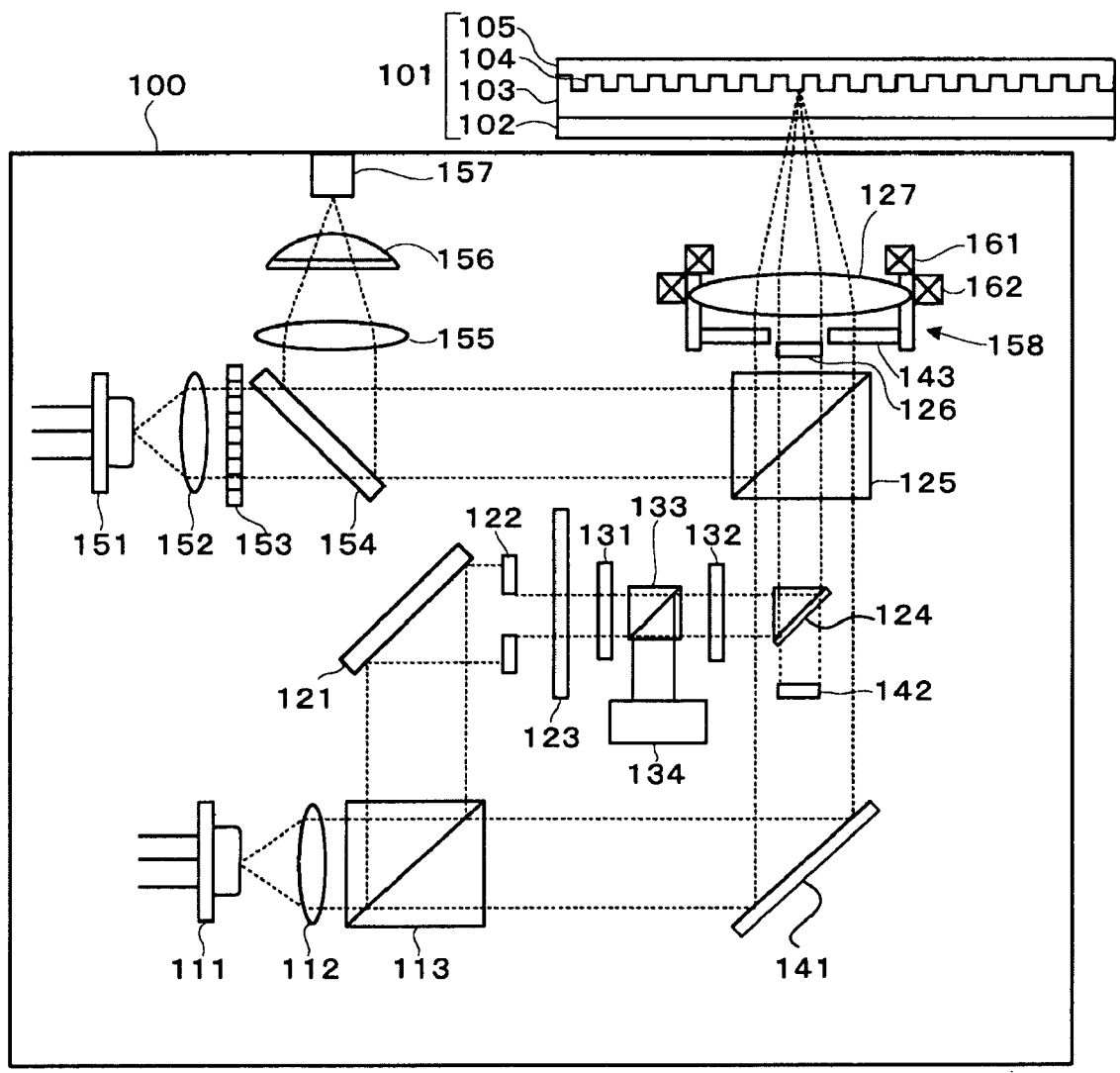
FIG. 1 is a schematic view of an optical unit in a hologram recording apparatus according to an embodiment of the present invention.
Figure 2:
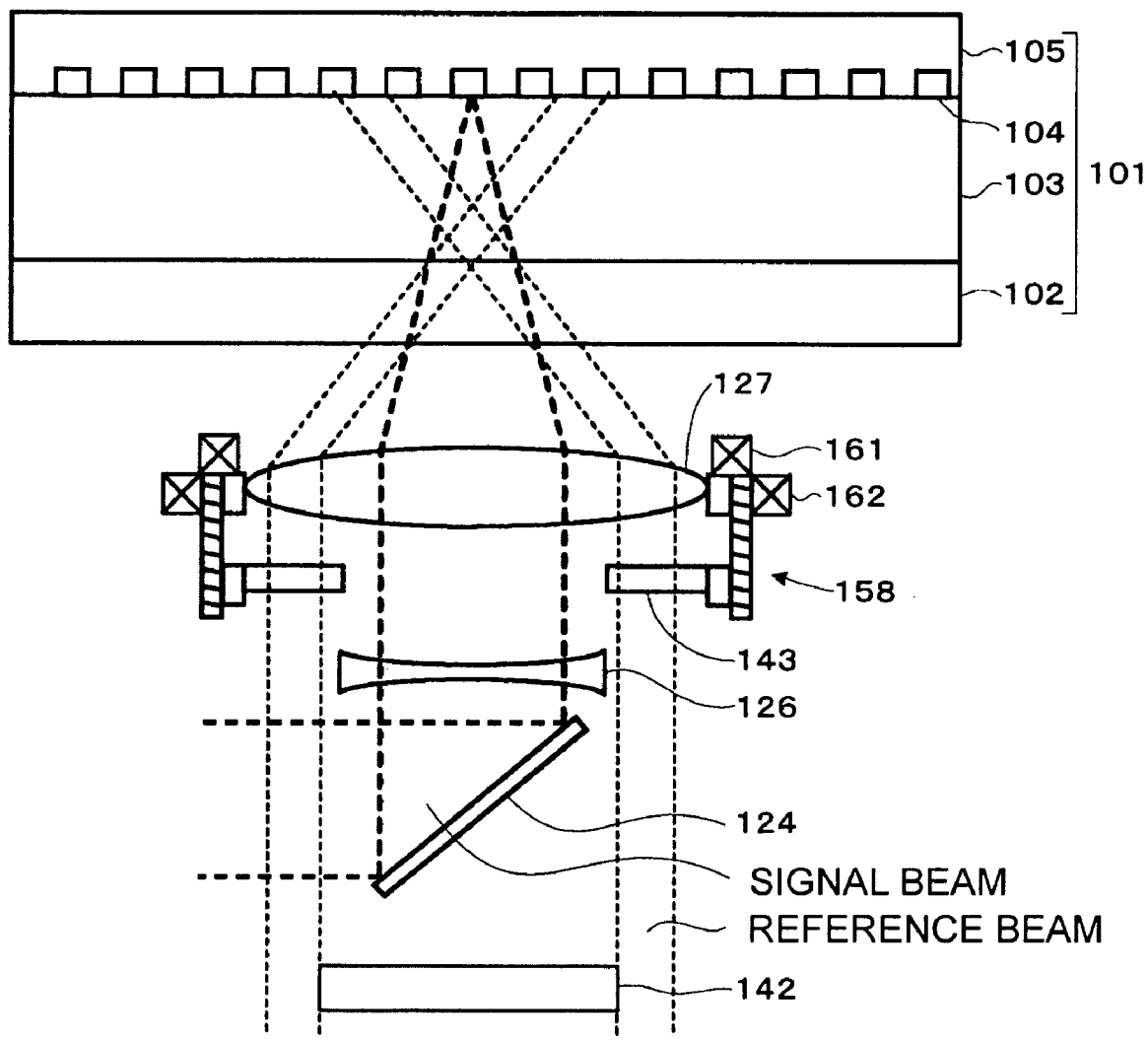
FIG. 2 is a partly enlarged schematic view of the optical unit.

FIG. 1 is a schematic view of an optical unit of a hologram recording apparatus according to an embodiment of the present invention. FIG. 2 is a partly enlarged schematic view of the optical unit. In FIG. 2, for easy understanding, some optical elements are not shown.

Referring to FIGS. 1 and 2, the hologram recording apparatus of the embodiment includes an optical unit 100, and records and reproduces information on and from a hologram recording medium 101.

The optical unit 100 includes a recording and reproduction light source 111, a collimator lens 112, a polarization beam splitter 113, a mirror 121, a pinhole 122, a spatial light modulator 123, a mirror 124, a dichroic mirror 125, a concave lens 126, an objective lens 127, Faraday cells 131 and 132, a polarization beam splitter 133, an image pickup device 134, a mirror 141, a shielding plate 142, a phase modulator 143, a servo light source 151, a collimator lens 152, a grating 153, a beam splitter 154, a light-collecting lens 155, a cylindrical lens 156, a photoreceptor 157, and a servo driving unit 158.

The hologram recording medium 101 includes a protective layer 102, a recording layer 103, grooves 104, and a reflective layer 105. Interference fringes formed by a signal beam and a reference beam are recorded on the hologram recording medium 101.

The protective layer 102 protects the recording layer 103 from the outside.

Interference fringes are recorded as changes in refractive index (or transmittance) on the recording layer 103. The recording layer 103 may be made of any organic or inorganic material whose refractive index (or transmittance) varies depending on the light intensity.

As an inorganic material, a photorefractive material whose refractive index is varied depending on the exposure by an electrooptical effect, for example, lithium niobate ($LiNbO_3$), may be used.

As an organic material, for example, a photopolymer may be used. In the photopolymer, monomers are uniformly distributed in a matrix polymer in an initial state. When the photopolymer is exposed to light, the monomers are polymerized in an exposed portion. With polymerization, the monomers move from the periphery, so that the concentration of the monomers becomes nonuniform.

Since the refractive index (or transmittance) of the recording layer 103 varies depending on the exposure, as described above, interference fringes formed by the interference between reference and signal beams can be recorded on the hologram recording medium 101 as changes in refractive index (or transmittance).

The hologram recording medium 101 is moved or turned by a driving means (not shown). An image at the spatial light modulator 123 can be recorded as multiple holograms on the hologram recording medium 101.

Since the hologram recording medium 101 is movable, recording and reproduction of information on and from the hologram recording medium 101 are performed along tracks provided in the direction of movement.

The grooves 104 are provided to exert servo control on the hologram recording medium 101, for example, tracking servo control and focusing servo control. That is, the grooves 104 are provided along the tracks on the hologram recording medium 101, and tracking servo control and focusing servo control are performed by controlling the collecting position and depth of the signal beam correspondingly to the grooves 104.

The recording and reproduction light source 111 is a laser light source, and is formed of, for example, a laser diode (LD) having a wavelength of 405 nm or a Nd-YAG laser having a wavelength of 532 nm.

The collimator lens 112 converts laser light emitted from the recording and reproduction light source 111 into parallel light.

The polarization beam splitter 113 splits parallel light from the collimator lens 112 into a signal beam and a reference beam. The polarization beam splitter 113 emits an s-polarized signal beam toward the mirror 121, and a p-polarized reference beam toward the mirror 141.

The mirrors 121, 124, and 141 change the traveling direction of incident light by reflection.

The pinhole 122 reduces the diameter of the signal beam.

The spatial light modulator 123 spatially (two-dimensionally in the embodiment) modulates the signal beam and superimposes data thereon. The spatial light modulator 123 is, for example, a transmissive liquid crystal device serving as a transmissive device, or a DMD (digital micromirror device), a reflective liquid crystal device, or a GLV (grating light value) device serving as a reflective device.

The dichroic mirror 125 combines light for recording and reproduction (laser light from the recording and reproduction light source 111) and light for servo control (laser light from the servo light source 151) into the same optical path. By utilizing the difference in wavelength between the recording and reproduction light from the recording and reproduction light source 111 and the servo light from the servo light source 151, the dichroic mirror 125 transmits the recording and reproduction light, and reflects the servo light. The surface of the dichroic mirror 125 is provided with a thin film so that it totally transmits the recording and reproduction light and totally reflects the servo light.

The concave lens 126 makes the convergence of the signal beam different from that of the reference beam. Only the signal beam passes through the concave lens 126, so that the collecting depth on the hologram recording medium 101 differs between the signal beam and the reference beam.

The objective lens 127 collects the signal beam and the reference beam onto the hologram recording medium 101.

The Faraday cells 131 and 132 turn the plane of polarization. The plane of polarization of the s-polarized light incident on the Faraday cell 131 is turned 45°, and the light is returned into its original state by the Faraday cell 132.

The polarization beam splitter 133 transmits polarized light incident from the Faraday cell 131, and reflects return light (reproduction light) reflected by the hologram recording medium 101 and returned from the Faraday cell 132.

The image pickup device 134 picks up a reproduced image.

The shielding plate 142 shields a part of the reference beam so that the reference beam does not overlap with the signal beam.

The phase modulator 143 gives the reference beam with a random phase or a certain fixed phase pattern, and is also referred to as a phase mask. The phase modulator 143 may be, for example, a frosted glass, a diffuser, or a spatial phase modulator. Alternatively, the phase modulator 143 may be a holographic device having a recorded phase pattern. Light having the phase pattern is reproduced from the holographic device.

The servo light source 151 emits laser light for servo control such as tracking servo control and focusing servo control, and the wavelength of the laser light is different from that of light emitted from the recording and reproduction light source 111. The servo light source 151 is, for example, a laser diode, and uses an oscillation wavelength (for example, 650 nm) that provides a low sensitivity to the hologram recording medium 101.

The collimator lens 152 converts laser light emitted from the servo light source 151 into parallel light.

The grating 153 separates laser light emitted from the collimator lens 152 into three beams, and is composed of two elements. The separation of the laser light is performed for servo control.

The beam splitter 154 transmits laser light emitted from the grating 153, and reflects return light reflected back from the hologram recording medium 101.

The light-collecting lens 155 collects return light from the beam splitter 154 onto the photoreceptor 157.

The cylindrical lens 156 changes the beam shape of laser light emitted from the light-collecting lens 155 from a circle to an ellipse.

The photoreceptor 157 is an element, such as a CCD, which receives return light and outputs a tracking error signal for tracking servo control and a focusing error signal for focusing servo control.

The servo driving unit 158 is a driving unit that drives the objective lens 127 according to a tracking error signal and a focusing error signal from the photoreceptor 157 for tracking and focusing control. The servo driving unit 158 includes driving coils 161 and 162.

The operation of the hologram recording apparatus will be outlined below.

A. Recording

A recording operation of the hologram recording apparatus will be described outlined.

Laser light emitted from the recording and reproduction light source 111 is collimated by the collimator lens 112, and is split into an s-polarized signal beam and a p-polarized reference beam by the polarization beam splitter 113.

The signal beam is reflected by the mirror 121, and the beam diameter thereof is reduced to a desired diameter by the pinhole 122. After the signal beam is subjected to spatial intensity modulation by the spatial light modulator 123, it passes through the Faraday cell 131, the polarization beam splitter 133, and the Faraday cell 132, is reflected by the mirror 124, and passes through the concave lens 126 that adjusts the focus on the hologram recording medium 101.

The reference beam passing through the polarization beam splitter 113 is reflected by the mirror 141, and only the center portion thereof is shielded by the shielding plate 142, so that the reference beam is formed into a desired beam shape. Consequently, the reference beam is not reflected by the mirror 124, but travels on the same optical path as that of the signal beam.

The objective lens 127 collects the signal beam and the reference beam at almost the same point on the hologram recording medium 101, thereby forming interference fringes on the hologram recording medium 101. As a result, information spatially modulated by the spatial light modulator 123 is recorded as a hologram on the hologram recording medium 101.

According to a servo signal output from the photoreceptor 157, the servo driving unit 158 operates to remove tracking and focusing errors. This operation will be described in detail later.

B. Reproduction

A reproducing operation of the hologram recording apparatus will be outlined.

During reproduction, a signal beam is blocked, and only a reference beam enters the hologram recording medium 101.

A reference beam emitted from the recording and reproduction light source 111 and passing through the polarization beam splitter 113 is reflected by the mirror 141, and only the center portion thereof is shielded by the shielding plate 142. Subsequently, the reference beam passes through the dichroic mirror 125, is given a phase pattern similar to that for recording by the phase modulator 143, and enters the hologram recording medium 101.

When the reference beam having such a phase pattern enters the hologram recording medium 101, diffracted light (reproduction light) is produced from a hologram recorded on the hologram recording medium 101.

The produced reproduction light travels along the reverse of the optical path of the signal beam, passes through the objective lens 127, the concave lens 126, and the dichroic mirror 125, and is reflected by the mirror 124.

The direction of polarization of the reproduction light reflected by the mirror 124 is turned by the Faraday cell 132. As a result, the reproduction light from the Faraday cell 132 is reflected by the polarization beam splitter 133, and is converted by the image pickup device 132 into electric signals corresponding to two-dimensional spatial data at the spatial light modulator 123. The output from the image pickup device 134 is binarized by a signal processor (not shown), and is converted into time-series binary data.

Hologram Recording with Phase Modulator 143

Figure 3:
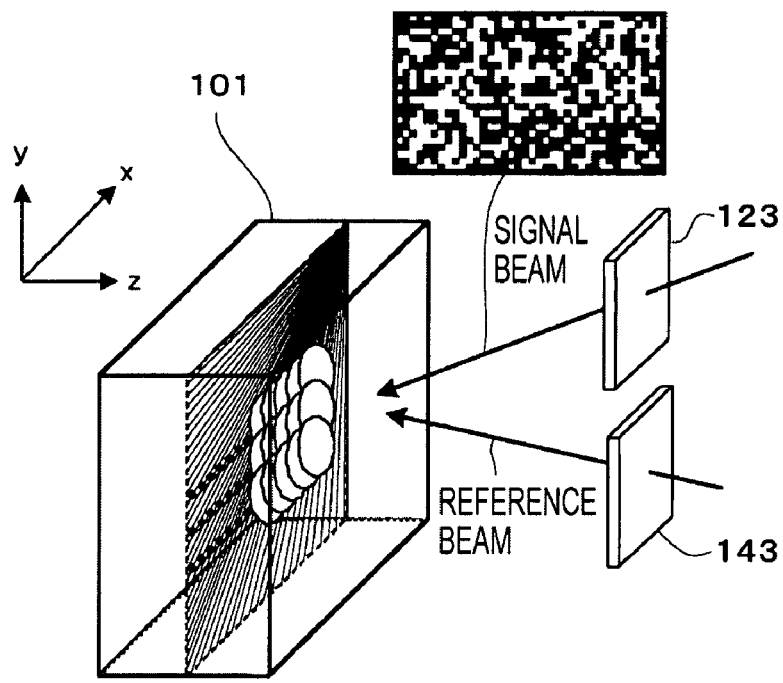
FIG. 3 is a schematic view showing holograms to be recorded and reproduced by the hologram recording apparatus.

FIG. 3 is a schematic view showing holograms recorded and reproduced by the hologram recording apparatus.

As shown in FIG. 3, a hologram is recorded on a hologram recording medium 101 by interference of a signal beam spatially modulated by the spatial light modulator 123 with a reference beam provided with a random phase pattern or a phase pattern having fixed regularity by the phase modulator element 143. A recorded hologram is reproduced by applying a reference beam having the same phase pattern as that used for recording onto the hologram recording medium 101 (phase correlation multiplexing).

Multiplex recording can be performed by shifting the hologram recording medium 101 or the phase modulator 143 in the x- or y-direction in FIG. 3.

When the hologram recording medium 101 or the phase modulator 143 is shifted in the x- or y-direction, the phase pattern of the reference beam changes, and the diffraction efficiency decreases.

Figure 4:
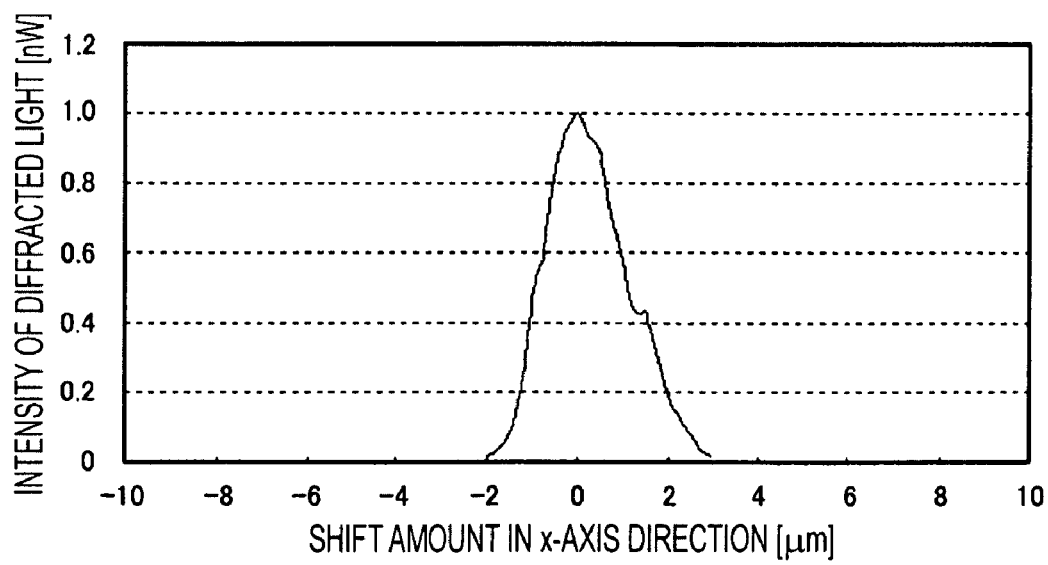
FIG. 4 is a graph showing the relationship between the x-direction shift amount and the diffraction efficiency.
Figure 5:
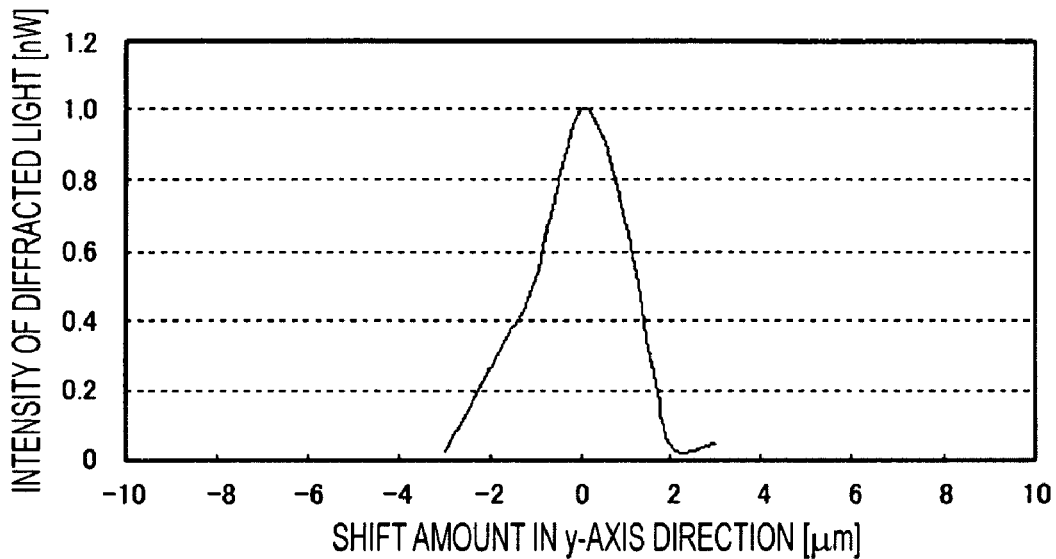
FIG. 5 is a graph showing the relationship between the y-direction shift amount and the diffraction efficiency.

FIGS. 4 and 5 are graphs showing the relationship between the shift amounts in the x- and y-directions and the diffraction efficiency.

FIGS. 4 and 5 show that the diffraction efficiency becomes approximately zero when the shift amount increases to several micrometers. Since signals are not reproduced when the shift amount in the x- or y-direction is several micrometers, diffraction at adjacent recorded holograms is prevented by setting the recording pitch correspondingly to this shift amount. Consequently, a plurality of holograms can be recorded at close positions.

Multiplex recording can also be performed by shifting the hologram recording medium 101 or the phase modulator 143 in the z-direction in FIG. 3 (the depth direction of the hologram recording medium 101). In this case, the diffraction efficiency also decreases because the phase pattern of the reference beam changes.

Figure 6:
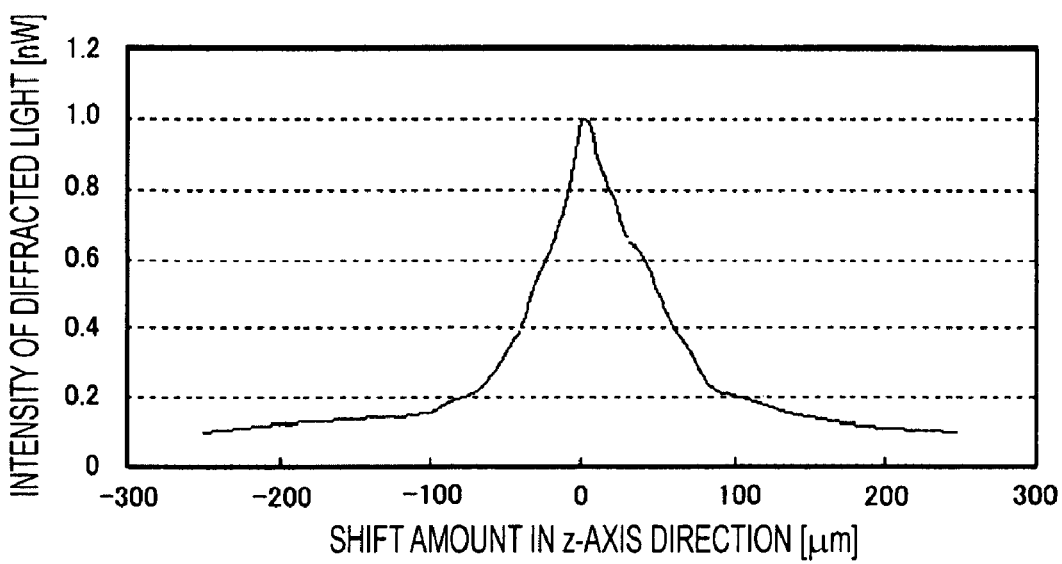
FIG. 6 is a graph showing the relationship between the z-direction shift amount and the diffraction efficiency.

FIG. 6 is a graph showing the relationship between the shift amount in the z-direction (layering direction, depth direction) and the diffraction efficiency.

FIG. 6 shows that the diffraction efficiency becomes approximately zero when the amount of shift increases to approximately 100 micrometers. Therefore, multiple holograms can be recorded by shifting the hologram recording medium 101 or the phase modulator 143 by approximately 100 micrometers in the layering direction (depth direction) of the hologram recording medium 101.

The relationships between the shift amounts in the x-, y-, and z-directions and the diffraction efficiency depend on the phase modulator 143. The graphs in FIGS. 4 to 6 show the results of experiments conducted with a holographic diffuser used as the phase modulator 143.

As described above, a hologram is formed on the hologram recording medium 101 by interference of the reference beam and the signal beam thereon. As the reference beam and the signal beam, the following beams may be used.

The reference beam may form a real image or a Fourier image of the phase modulator 143 on the hologram recording medium 101. Alternatively, the reference beam may be in the Fresnel region so as not to form a clear image on the hologram recording medium 101.

The signal beam may form a real image or a Fourier image of the spatial light modulator 123 on the hologram recording medium 101. Alternatively, the signal beam may form an image slightly defocused from the real image or the Fourier image.

By appropriately combining the image-forming states of the reference beam and the signal beam, holograms can be formed and data can be recorded on the hologram recording medium 101.

A description will be given of procedures for recording information on the hologram recording medium 101 while shifting the hologram recording medium 101 in the x-, y-, and z-directions. Both cases in which the hologram recording medium 101 is card-shaped and disk-shaped will be described below.

Recording is performed by the following methods (1) to (3):

(1) Recording is performed on the entire surface of a card-shaped hologram recording medium 101 by shifting the hologram recording medium 101 in the x- and y-directions (shifting a disk-shaped hologram recording medium 101 along the track). Subsequently, recording is performed on the entire surface of the hologram recording medium 101 by shifting the hologram recording medium 101 in the z-direction (depth direction), and further shifting the hologram recording medium 101 in the z-direction. These operations are repeated until the dynamic range (total recording capacity) is used up.

(2) After a certain region on the hologram recording medium 101 is subjected to recording, it is subjected again to recording with the hologram recording medium 101 shifted in the z-direction. When the dynamic range of the region is used up, recording on the next region is similarly performed.

(3) Multiplex recording in the z-direction is first performed at one location. After shifting in the x- and y-directions, multiplex recording in the z-direction is performed again.

Method (1) is easily applied to read-only recording media (ROM) that are designed so that recording thereon is not performed by users. Method (2) is easily applied to write once recording media because regions can be individually subjected to later processing. In method (3), the density of one hologram recording medium can be easily increased without wasting the dynamic range.

In hologram multiplex recording, the residual quantity of the recording material (polymer as an organic material) decreases as recording is repeated. For this reason, it is preferable to use a scheduling recording method when repeating recording on the same position. In the scheduling recording method, the diffraction efficiencies of holograms are made the same by gradually increasing the recording energy.

The scheduling recording method can be carried out in various manners depending on the order in which shifting operations in the x-, y-, and z-directions are performed. Even when the recording energy is constant during recording, the diffraction efficiency of the hologram varies depending on the residual quantity of the recording material.

Figure 7:
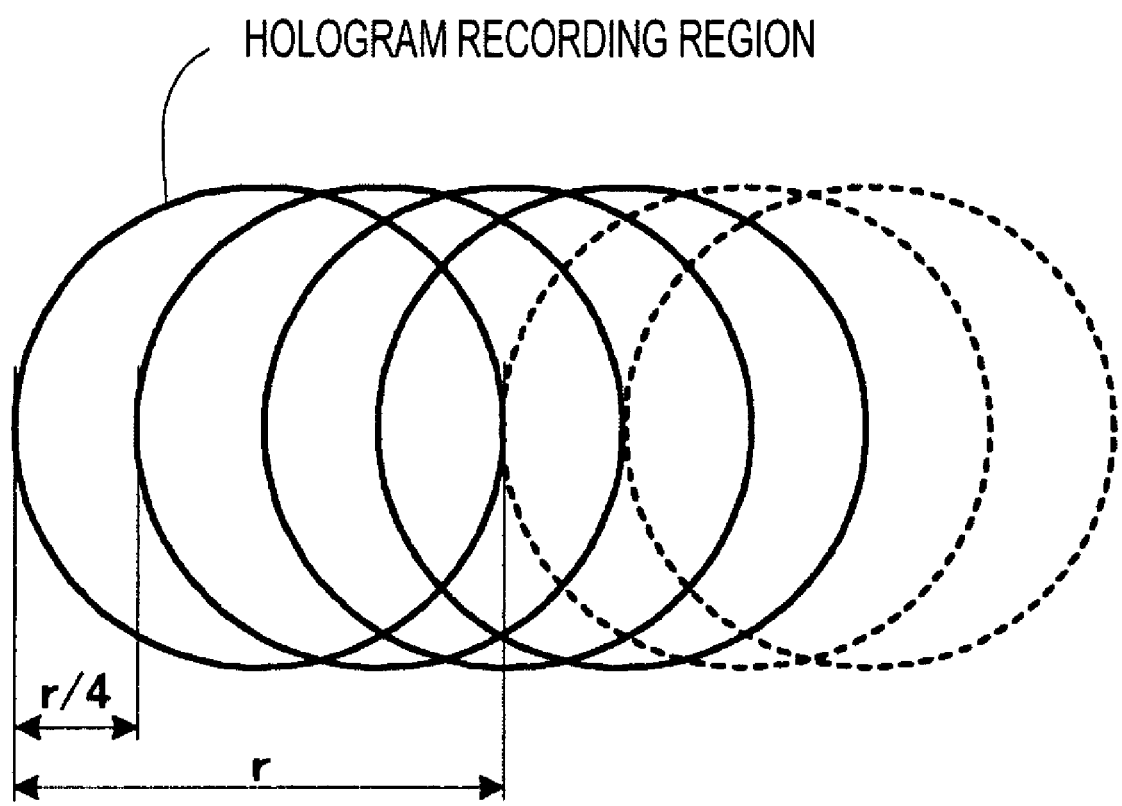
FIG. 7 is a schematic view showing an example of a state in which hologram recording regions overlap on a hologram recording medium.

In an example of a basic scheduling method, the recording energy is adjusted in accordance with the quantity of an unexposed recording material in a hologram recording region. FIG. 7 shows a case in which the shift pitch is equal to a quarter of the hologram size (diameter r).

In FIG. 7, four hologram recording regions overlap one another. Since the quantity of the recording material decreases as first, second, third, and fourth holograms are recorded in that order, it is preferable to increase the recording energy (light intensity) in accordance with the number of recording operations. However, when holograms subsequent to the fourth hologram are recorded, the residual quantity of the recording material in the hologram recording regions is substantially constant. Therefore, the subsequent holograms are recorded with almost the same energy as that for the fourth hologram.

On a disk-shaped hologram recording medium, the first one track can be recorded without changing the energy. In contrast, for recording of the second track in a reduced track pitch, it is necessary to perform scheduling recording in accordance with the residual quantity of the recording material. For the next layer in the layering direction, recording is basically performed on the same region. Therefore, recording is performed again with a recording energy in accordance with the residual quantity of a recording material that is not exposed during recording on the first layer. This also applies to a case in which the number of recording operations in the layering direction further increases.

In Method (1), the recording energy is gradually increased according to the track number (M/#) of the hologram recording medium in a track start portion (in an unrecorded portion of the hologram recording medium), and is not changed while the hologram recording medium is uniformly used, as described above. Multiplex recording in the z-direction (layering direction) is performed according to the multiplicity of holograms recorded in the same region on the first layer. For example, when the multiplicity of holograms recorded on the first layer is 100, scheduling recording starts on the second layer correspondingly to the 101st hologram, and on the third layer correspondingly to the 201st hologram.

In Method (2) according to the recording order, scheduling recording is performed on the recording regions, in a manner similar to that in Method (1).

In Method (3), scheduling recording is first performed in the z-direction (layering direction), and recording is performed with an energy in accordance with the residual amount of monomers during shifting in the x- and y-direction (planar direction). Furthermore, multiplex recording in the z-direction (layering direction) may be performed from the surface toward the inner side of the hologram recording medium, or from the inner side toward the surface.

This multiplex recording in the z-direction can be combined with various multiplex recording methods.

For example, the multiplex recording may be combined with angle multiplexing. Holograms are recorded on one recording region while changing the incident angles of two beams (signal beam and reference beam), and holograms are then recorded by changing the incident angles of the beams after shifting the hologram recording medium or the phase modulator in the depth direction (z-direction). Shift multiplexing in the depth direction can be performed until the dynamic range of the hologram recording medium is used up.

With only angle multiplexing, in order to increase the multiplicity in one recording region, it is necessary to perform recording with the minimum angle shift or to extend the range over which the angle changes. In the former method, crosstalk is caused between lateral angular components by the reduction of the angle shift. In the latter method, the diffraction efficiency is changed by the difference between the angular components. This may make it difficult to perform recording and to mount an angle adjusting mechanism.

In contrast, when multiplexing in the z-direction (depth direction) and angle multiplexing are combined, the angle shift pitch is not strictly limited, and a sufficient recording density can be ensured without extending the angular range.

Similar advantages can be provided by a combination with wavelength multiplexing or rotation multiplexing. When wavelength multiplexing is combined, the wavelength shift is larger than when only wavelength multiplexing is performed. In combination with rotation multiplexing, the rotation angle shift is not strictly limited. As a result, the recording density increases.

As described above, the recording density can be increased by combining multiplexing in the z-direction with other multiplexing methods.

For example, in combination with multiplexing in the x- or y-direction, the recording density can be increased by recording several to several tens of holograms in the z-direction without reducing the shift in the surface direction. Therefore, the shift in the surface direction can have some margin.

In order to reduce crosstalk in multiplexing in the surface direction, for example, a phase modulator having a fine phase pattern is used. In this case, it is necessary to increase the alignment accuracy of the optical system. However, since the recording density can be increased by multiplexing in the depth direction (z-direction) while shifting the hologram recording medium or the phase modulator. Accordingly, the recording density can be increased even when the phase modulator has a rough phase pattern.

It should be understood by those skilled in the art that various modifications, combinations, sub-combinations and alterations may occur depending on design requirements and other factors insofar as they are within the scope of the appended claims or the equivalents thereof.

The invention claimed is:

1. A hologram recording method comprising:
performing angle multiplexing by collecting a signal beam modulated by a light modulator and a reference beam phase-modulated by a phase modulator at almost the same collecting position on a hologram recording medium;
changing the distance between the hologram recording medium and the phase modulator; and
performing angle multiplexing by collecting the signal beam modulated by the light modulator and the reference beam phase-modulated by the phase modulator at the collecting position on the hologram recording medium after the distance between the hologram recording medium and the phase modulator is changed.

2. A hologram recording method comprising:
performing wavelength multiplexing by collecting a signal beam modulated by a light modulator and a reference beam phase-modulated by a phase modulator at almost the same collecting position on a hologram recording medium;
changing the distance between the hologram recording medium and the phase modulator; and
performing wavelength multiplexing by collecting the signal beam modulated by the light modulator and the reference beam phase-modulated by the phase modulator at the collecting position on the hologram recording medium after the distance between the hologram recording medium and the phase modulator is changed.

3. A hologram recording method comprising:
performing rotation multiplexing by collecting a signal beam modulated by a light modulator and a reference beam phase-modulated by a phase modulator at almost the same collecting position on a hologram recording medium;
changing the distance between the hologram recording medium and the phase modulator; and
performing rotation multiplexing by collecting the signal beam modulated by the light modulator and the reference beam phase-modulated by the phase modulator at the collecting position on the hologram recording medium after the distance between the hologram recording medium and the phase modulator is changed.

* * * * *